US011914900B2

(12) United States Patent
Segev et al.

(10) Patent No.: US 11,914,900 B2
(45) Date of Patent: Feb. 27, 2024

(54) STORAGE SYSTEM AND METHOD FOR EARLY COMMAND CANCELATION

(71) Applicant: Western Digital Technologies, Inc., San Jose, CA (US)

(72) Inventors: Amir Segev, Meitar (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 64 days.

(21) Appl. No.: 17/828,489

(22) Filed: May 31, 2022

(65) Prior Publication Data
US 2023/0384976 A1  Nov. 30, 2023

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
See application file for complete search history.

(56) References Cited

U.S. PATENT DOCUMENTS

| 9,052,835 | B1* | 6/2015 | Darrington ............. G06F 3/061 |
| 9,792,046 | B2 | 10/2017 | Desai et al. |
| 9,812,209 | B2 | 11/2017 | Gueta et al. |
| 10,620,832 | B1 | 4/2020 | Nemawarkar et al. |
| 2013/0179614 | A1 | 7/2013 | Ross et al. |
| 2016/0034187 | A1* | 2/2016 | Desai .................... G06F 3/0659 711/115 |
| 2017/0236597 | A1* | 8/2017 | Kondo ............... G11C 29/1201 365/201 |
| 2018/0341606 | A1 | 11/2018 | Bolkhovitin et al. |
| 2019/0278514 | A1 | 9/2019 | Chaturvedi et al. |
| 2022/0107758 | A1 | 4/2022 | Benisty et al. |
| 2022/0113901 | A1 | 4/2022 | Turner et al. |

* cited by examiner

*Primary Examiner* — Gurtej Bansal
(74) *Attorney, Agent, or Firm* — Crowell & Moring LLP

(57) ABSTRACT

A storage system receives an instruction to cancel an in-progress read/write command. The storage system allows data associated with the command to continue to be processed by a data path in the storage system even though the command was cancelled. However, before the data is actually transferred out of the data path, a controller determines that the command was cancelled and prevents the data from being transferred out, while internally indicating that the transfer was complete. This provides a faster cancellation process than methods that attempt to stop the data from being processed by the data path.

20 Claims, 10 Drawing Sheets ated to an embodiment.

STORAGE SYSTEM AND METHOD FOR EARLY COMMAND CANCELATION

BACKGROUND

A host can send write commands to store data in a memory of a storage system and send read commands to read data from the memory of the storage system. There are situations (e.g., resets, aborts, power modes, and name space deletions) in which a read or write command may need to be cancelled or aborted. Abort commands can be placed at the top of a queue, resulting in the aborting commands that are already in progress of execution. The Universal File System (UFS) protocol has a strict requirement for execution of abort commands, requiring the abort command to be completed in about 50 milliseconds. To accomplish this, firmware can take over the hardware engines of the device and manage the data flow. In other storage systems, such as consumer solid-state drives (cSSDs), firmware can use "best efforts" to block the command from a specific stage, allowing everything past that stage to complete normally.

DETAILED DESCRIPTION

The following embodiments generally relate to a storage system and method for early command cancelation. In one embodiment, a method is provided that is performed in a storage system comprising a memory and a data path. The method comprises: prior to completion of an in-progress command to transfer data between a host and the memory, receiving an instruction to cancel the command; allowing data associated with the command to be processed by the data path even though the command was cancelled; and after the data has been processed by the data path but prior to transferring the data out of the data path: determining not to transfer the data out of the data path because the command was cancelled; and indicating that the data was transferred out of the data path even though it was not.

In another embodiment, a storage system is provided comprising a memory, a host interface, and a data path coupled with the memory and the host interface, wherein the data path comprises a direct memory access (DMA) controller; and a processor. The processor is configured to allow data associated with an in-progress read/write command to be processed by the data path even after the read/write command has been aborted. The DMA controller is configured to identify that the read/write command was aborted and, in response, prevent the data being sent from the data path to the host or the memory.

In yet another embodiment, a storage system is provided comprising a memory; means for allowing data associated with an in-progress memory access command to be processed even after the memory access command has been cancelled; and means for determining that the memory access command was cancelled and, in response, preventing the memory access command from being completed but nonetheless indicating otherwise.

Other embodiments are provided and can be used alone or in combination.

Figure 1A:
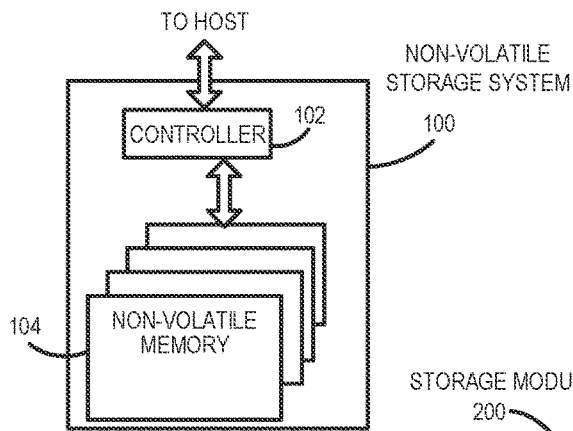
FIG. 1A is a block diagram of a non-volatile storage system of an embodiment.

Turning now to the drawings, storage systems suitable for use in implementing aspects of these embodiments are shown in FIGS. 1A-IC. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

Figure 1B:
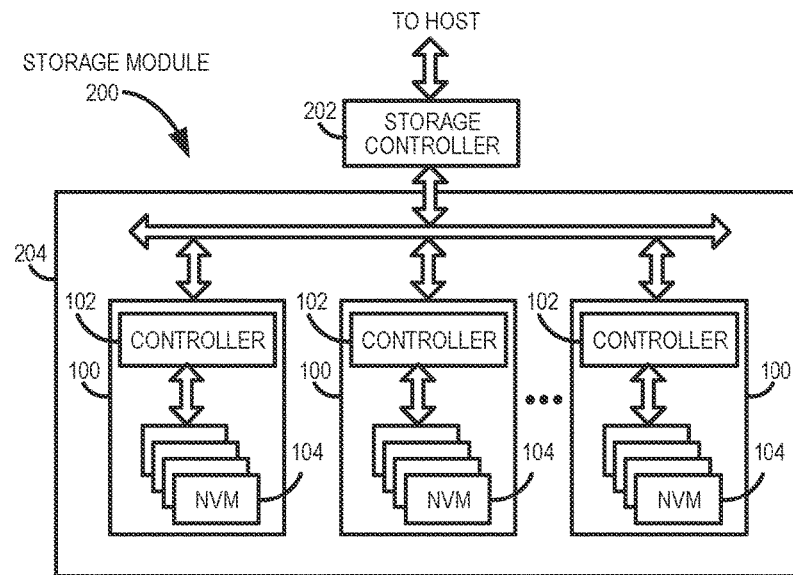
FIG. 1B is a block diagram illustrating a storage module of an embodiment.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

Figure 1C:
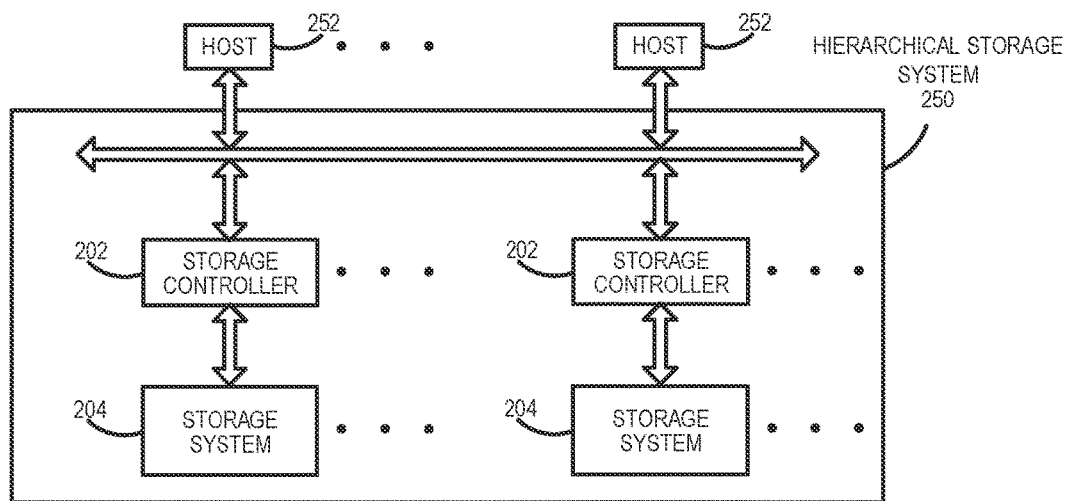
FIG. 1C is a block diagram illustrating a hierarchical storage system of an embodiment.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
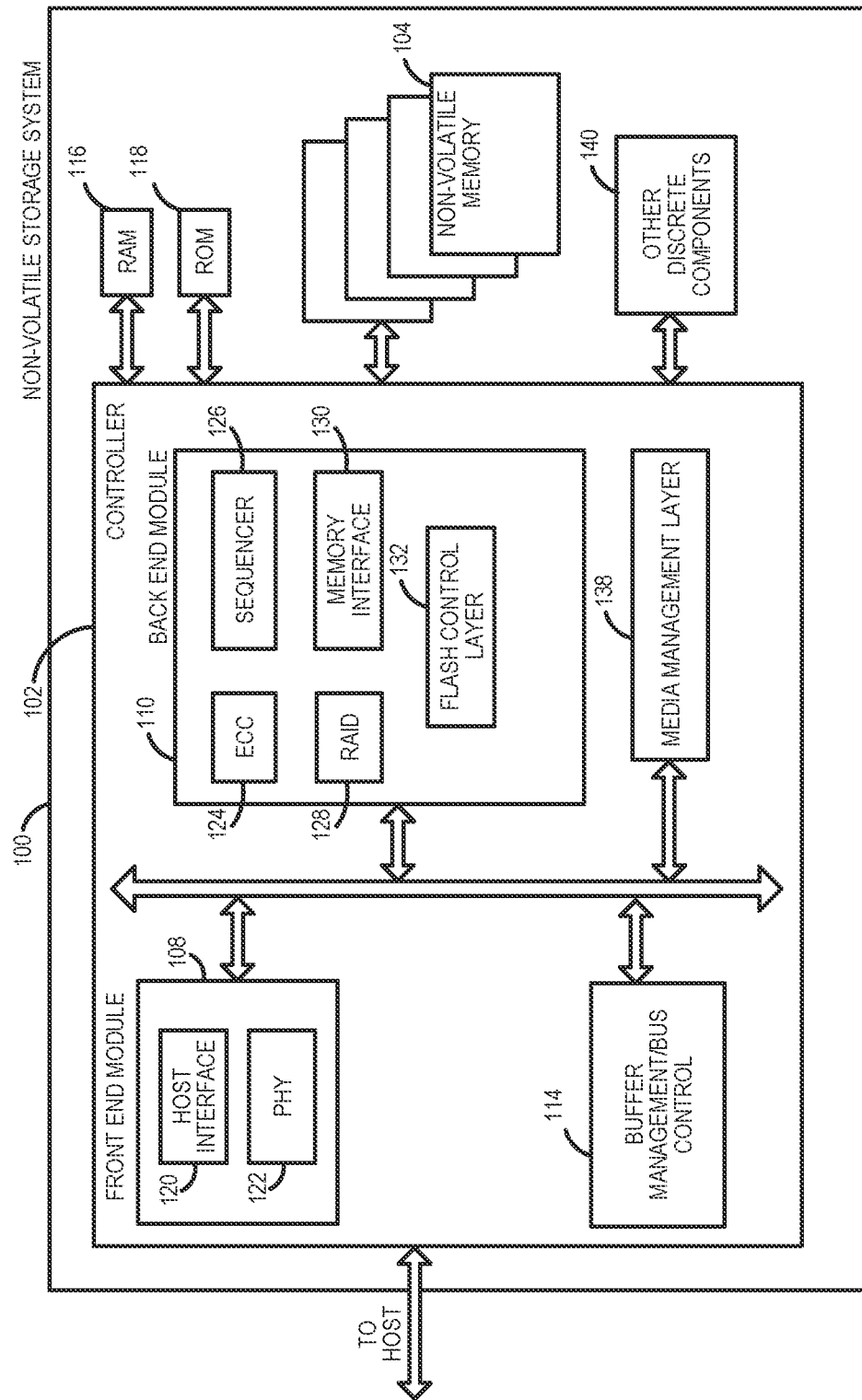
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR)

interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
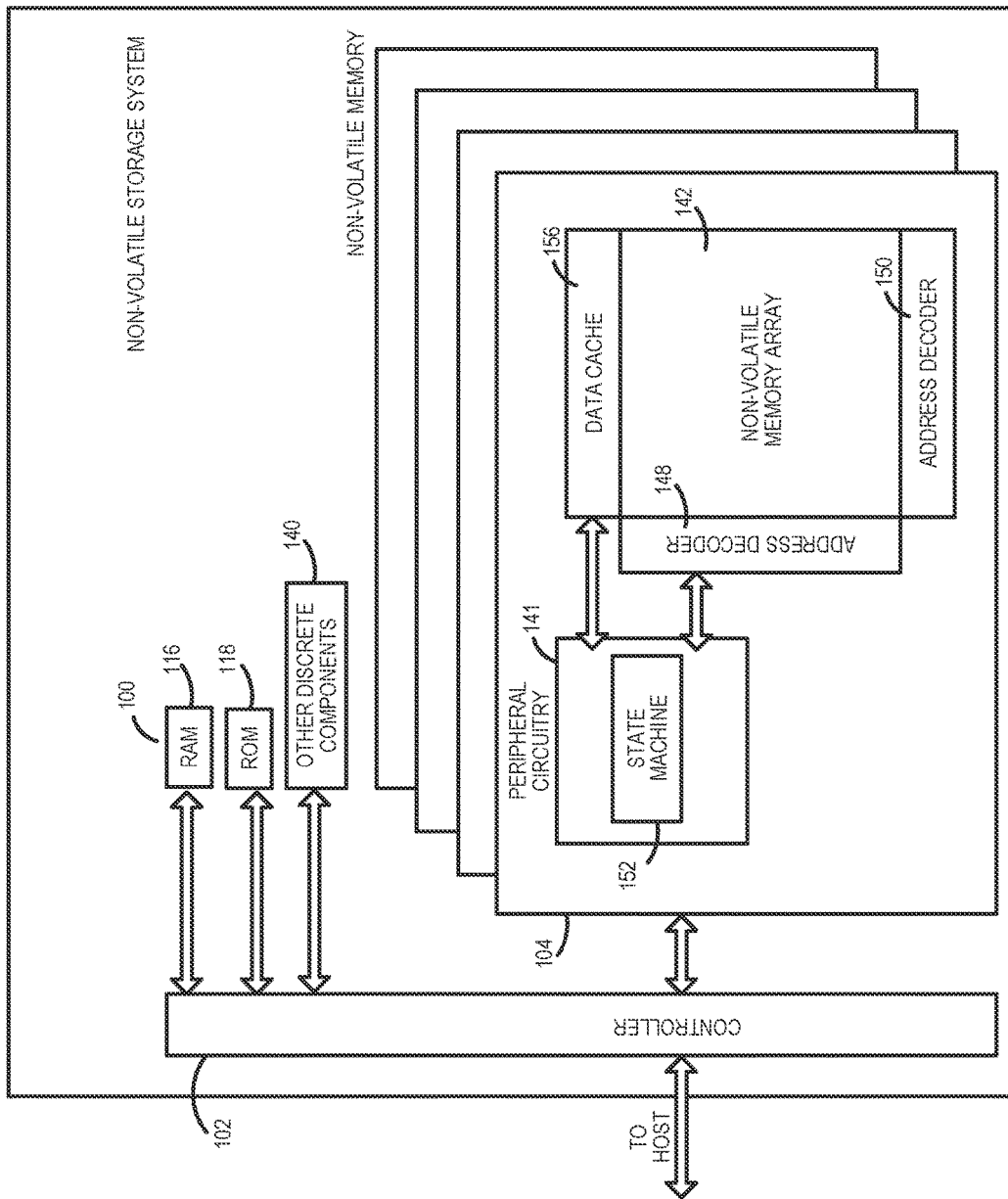
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
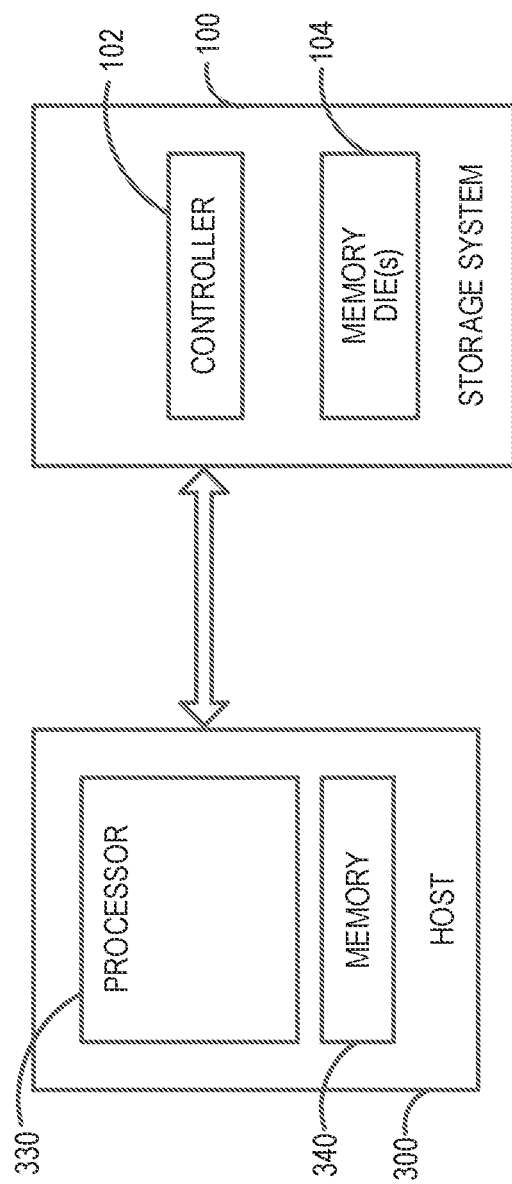
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

Figure 4:
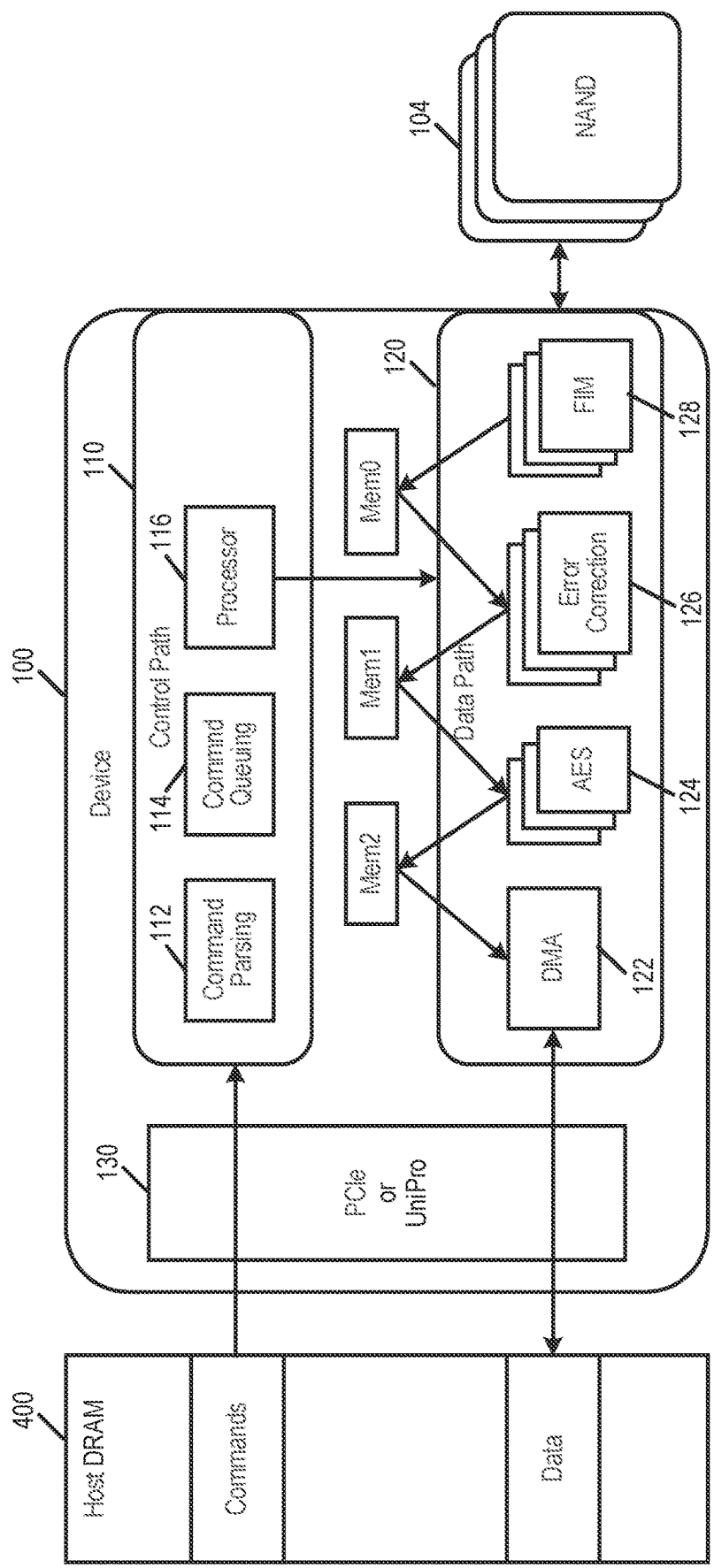
FIG. 4 is a block diagram illustrating a data flow in a storage system of an embodiment.

FIG. 4 is a block diagram showing some example components of the host 300 and storage system 100 (other components are not shown to simplify the drawing). As shown in FIG. 4, in this embodiment, the host 300 comprises a host DRAM 400, and the storage system 100 comprises a host interface (here, a PCIe or UniPro interface) 130, a control path 110, and a data path 120. The control path 110 comprises a command parsing module 112, a command queuing module 114, and a processor 116. The data path 120 comprises a DMA controller 122, an encryption (here, AES) module 125, an error correction module 126, and a flash interface module (FIM) 128 that communicates with the memory 104, which can be inside the storage system 100. This type of storage system architecture can be used with any suitable protocol (e.g., UFS and NVMe/PCIe) and for any suitable sector (e.g., iNAND, cSSD, and eSSD). Some or all of the components in the control and data paths 110, 120 can be in the controller 102. Accordingly, various actions performed by individual ones of these components can be referred to as being performed by the controller 102.

In operation, the host 300 issues a command to the storage system 100. The command goes through some parsing by the command parser 112 to check, for example, if there are any errors. The command is than queued into some queuing mechanism by the command queuing module 114 to allow prioritizing between commands. Finally, the processor 116 breaks the command into executable parts, allocates the required memory buffers (Mem0, Mem1, Mem2), and triggers the hardware engine/DMA controller 122, which is responsible for the data path 120. When the FIM 128 receives instructions via descriptors generated by the processor 116, it reads the required chunk(s) of data from the memory 104 to data buffer Mem0. The error correction engines 126 receive descriptors from the processor 116 and, when the data is ready in Mem0, error corrects the data and stores the corrected data in Mem1. The AES encrypt/decrypt engines 124 receive instructions form the processor 116 and decrypt and move data from Mem1 to Mem2. At the end, a single DMA controller 122 moves data from Mem2 to the host 300 (which stores the data in host DRAM 400) after arbitrating between all prepared data in Mem2. While this example was described in terms of a read command, it should be understood that the reverse process can be performed for a write command.

Figure 5:
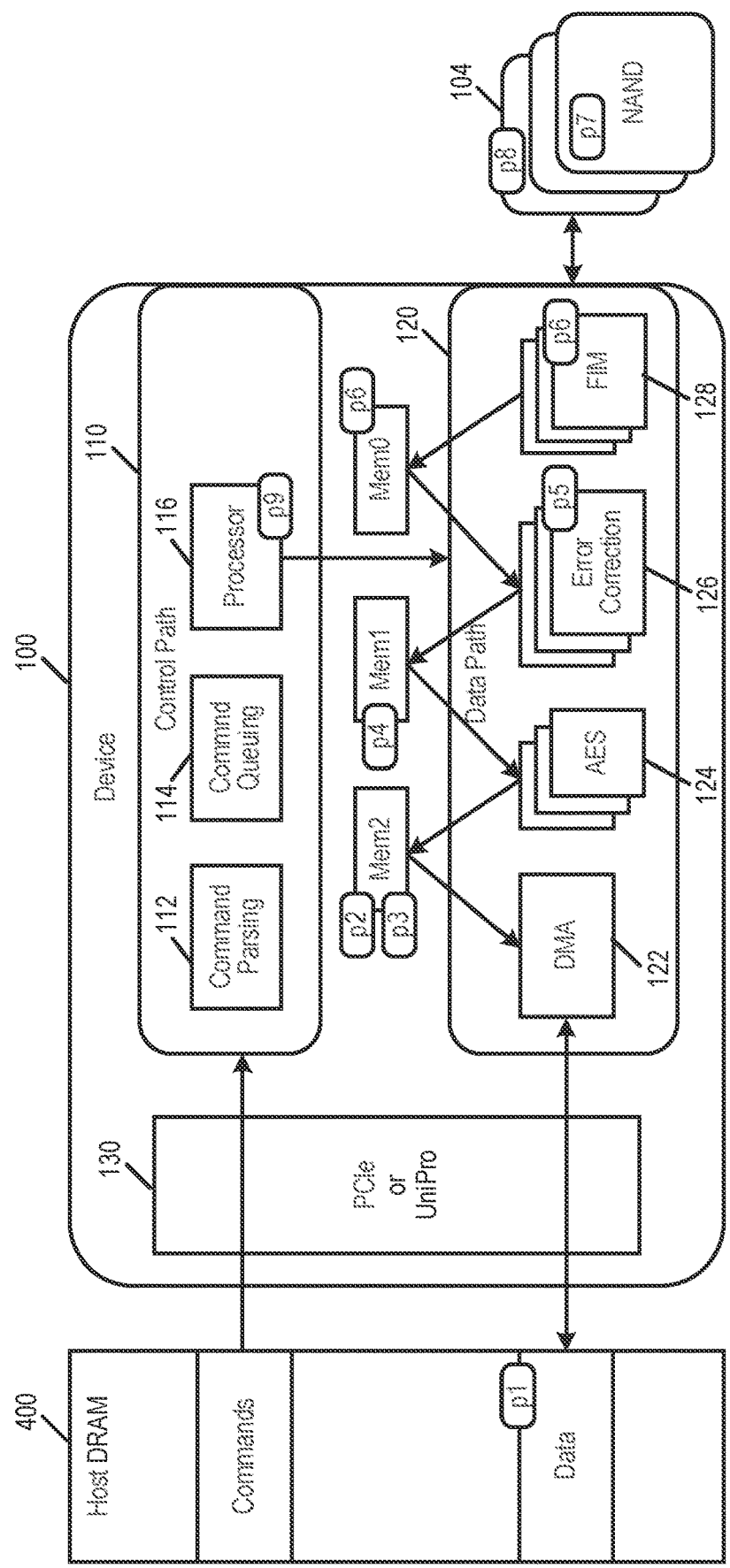
FIG. 5 is a block diagram illustrating a command flow in a storage system of an embodiment.

As mentioned above, there are situations (e.g., resets, aborts, power modes, and name space deletions) in which a read or write command (which are generally referred to herein as a "memory access command") may need to be cancelled or aborted. Abort commands can be placed at the top of a queue, requiring the aborting of commands that are already in progress of execution. As a result, a command to be cancelled may be spread across multiple locations in a piped design. This problem is illustrated in FIG. 5. The command in the example shown in FIG. 5 is in nine parts (logical block addresses (LBA)). The control path 110 requests the data path 120 to work on eight LBAs, and the ninth (p9) is still "pending" inside the control path 100. In this example, part 1 (p1) has already been transferred and stored in the host DRAM 400, parts 2, 3, 4, and 6 (p2, p3, p4, p6) reside is the internal SRAM buffers (Mem0, Mem1, Mem2), part 5 (p5) is being worked on by the error correction module 126, some of part 6 (p6) is being worked on by one of the FIM engines 128 (the rest of p6 is in Mem0), and parts 7 and 8 (p7, p8) are still in the memory 104. As shown by this example, a single command can have residue in the engines and/or memories of the data path 120 and possibly even in the control path 110. As a result, to cancel a command, the firmware in the controller 102/processor 110 needs to check what every engine is currently working on, what tasks are expected in its descriptor/instruction pipe, and act upon it.

Further, the firmware in the processor 116 may also need to pause the FIM 128 or wait for it to go into idle mode (until p6 is in Mem0) and look at all of the FIM input queues to find the instructions related to p7 and p8. It may than need to rearrange the queues after removing the instructions related to the canceled command. This process may need to be repeated for all engines in general and all FIM engines 128 in particular. Even if the FIM 128 is not part of the flow, it may be required to allow the firmware to check for relevant residues. Only after checking can the firmware actually know if the pause of the FIM engine 128 was justified. In addition to handling the hardware engines, the memory buffers may need to be deallocated.

There are several approaches that can be taken to address this. For example, in a Universal File System (UFS) device, firmware can take over the hardware engines of the device and manage the data flow. The drawbacks to this approach include firmware complexity, error-prone design/flows, and the long wait time for completing the cancellation. In other storage systems, such as consumer solid-state drives (cSSDs), firmware can use "best efforts" to block the command from a specific stage, allowing everything past that stage to complete normally. However, in some situations, this approach can result in transferring data to the host.

The following embodiments can be used to address this situation and very quickly perform command cancellation without breaking the data pipeline and without the need for complicated dedicated firmware. These embodiments provide a flow that can be used in scenarios both where a command is cancelled and where a command is not cancelled, regardless of the phase in which each part of the command resides. In one embodiment, the processor 116 marks cancelled commands with a cancel flag, sends abort complete messages (for protocols and cases that require them), and drains all the data at a single point (e.g., the last DMA controller in the data path 120). All the other flows, such as scheduling, error correction, reading from the memory, arbitration between threads, etc.) can continue as usual. Only the data transfer to the host 300 is skipped. When required, the response to the canceled command can be sent immediately and prior to finishing the command.

Figure 6:
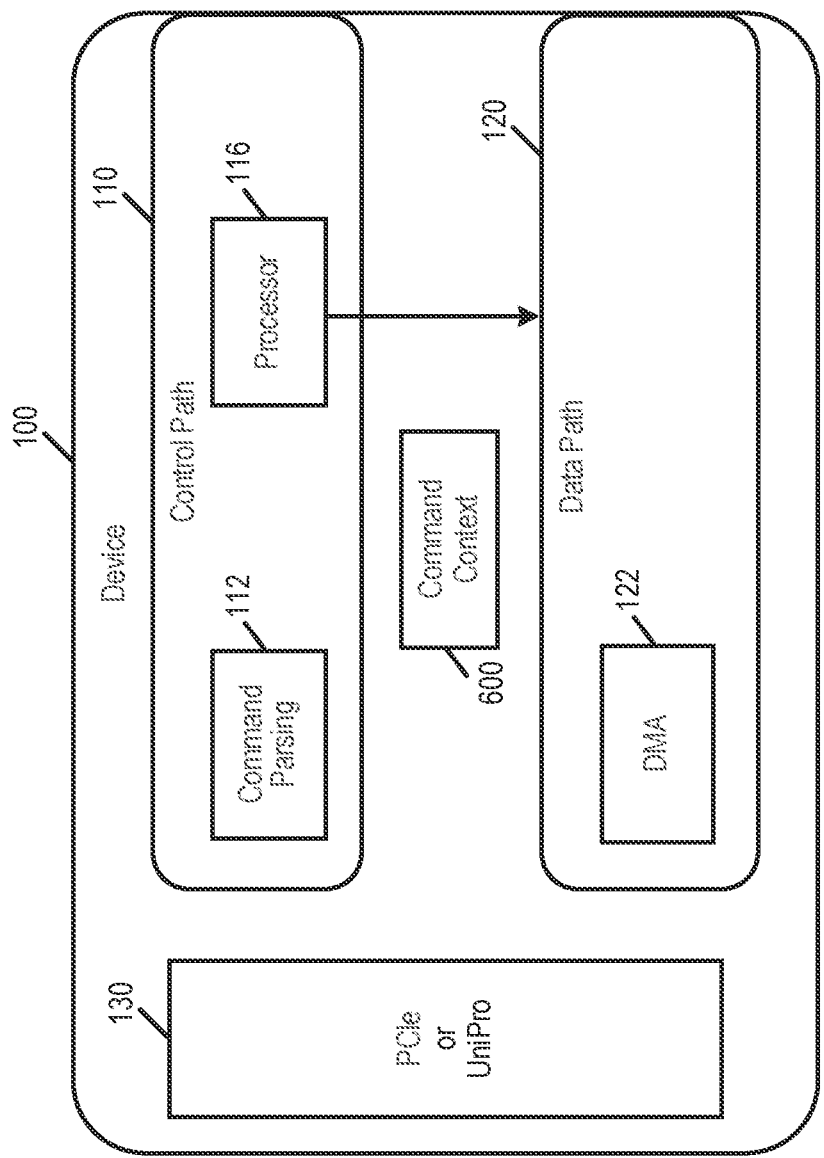
FIG. 6 is a block diagram illustrating the use of a command context in a storage system of an embodiment.

FIG. 6 illustrates an example of this embodiment and the use of a command context. As shown in FIG. 6, in this embodiment, far fewer components are involved in the command cancellation process as compared to the embodiment shown in FIG. 5. More specifically, this embodiment uses the command parsing module 112 and processor 116 in the control path 110 and the DMA controller 122 in the data path 120. To do this, a command context 600 is used. As used herein, a "command context" refers to data structure (e.g., database, table, etc.) that stores attribute(s) related to command(s), such as, but not limited to, an identification of the command as a read command or write command, the size of the command, and the address of the command. In one embodiment, the command context comprises an indication of cancellation status and an indication of size.

An indexing system can be used to associate a command with its associated entries in the data structure. In one embodiment, the command parser 112 can create and maintain/update the command context 600; however, other components (e.g., hardware engines) can also take part in creating and maintaining/updating this data structure. In an alternate embodiment, a command context is not used, but each command has an index that allows it to be selected and cancelled.

In one embodiment, a bit is added in each entry in the command context 600 to mark the command as canceled. When the DMA controller 122 needs to service a part of the command, it will check if a cancel was requested. If it was, it will not perform the DMA operation but will still report the DMA operation as successful. As a result, the entire data pipe will continue to function normally (e.g., memory allocation, descriptor consumption, etc.). The firmware/processor 116 can than send (or skip) the completion of the canceled command as soon as it marks the relevant abort attribute in the command context 600.

Figure 7:
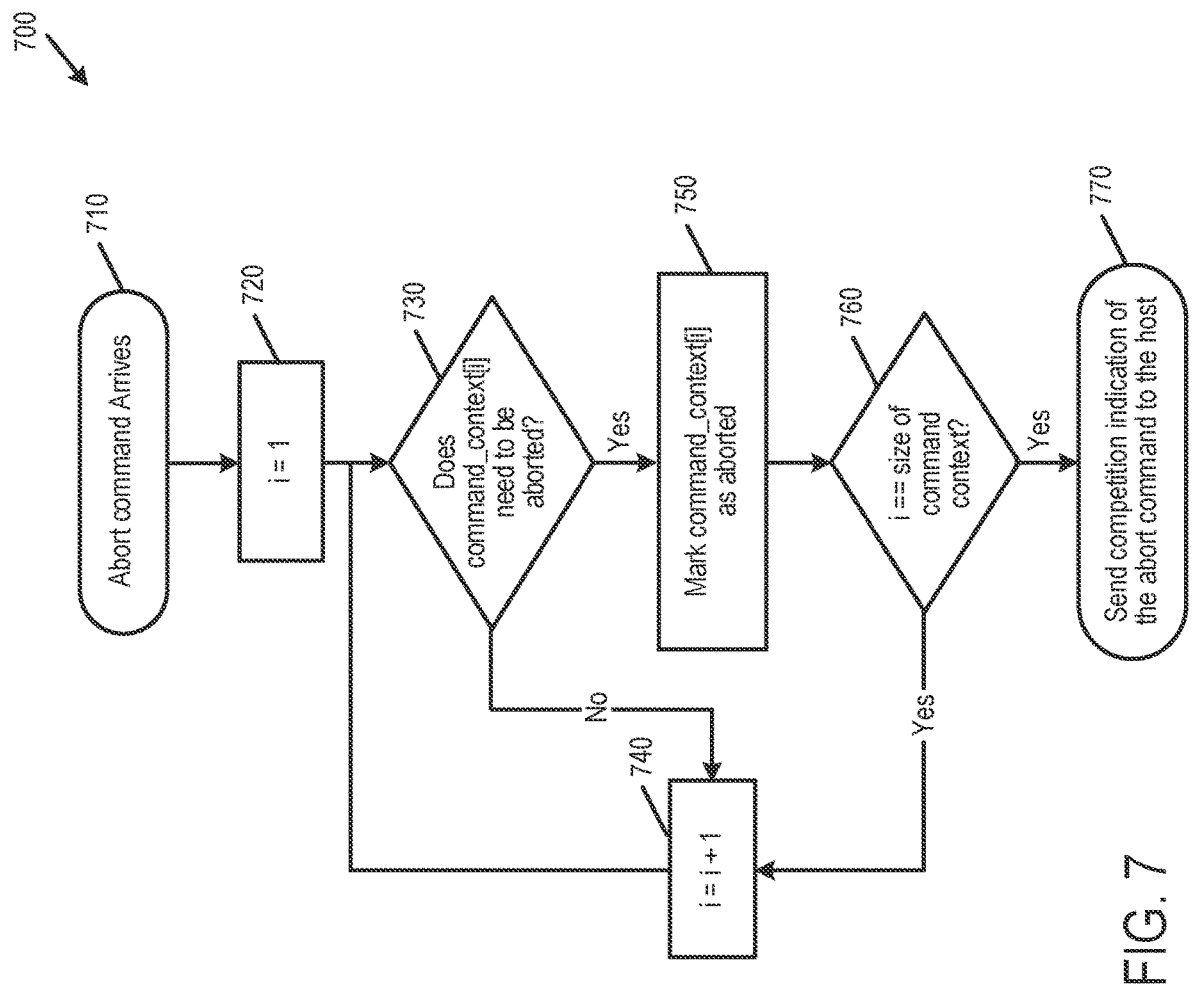
FIG. 7 is a flow chart of a method of an embodiment for early command cancelation.

FIG. 7 is a flow chart 700 that illustrates this operation. As shown in FIG. 7, an abort command is received from the host 300 (act 710), and the processor 116 sets a variable [i] to 1 (act 720). The processor 116 then determines if the command associated with entry "command_context[i]" in the command context 600 needs to be aborted (act 730). If the processor 116 determines that it does not need to be aborted, the processor 116 increases variable [i] to [i+1] (act 740) and loops back to act 730. If the processor 116 determines that it does need to be aborted, the processor 116 marks command_context[i] as aborted (act 750) and then determines if [i] equals the size of the command context 600 (act 760). If [i] does not equal the size of the command context 600, the processor 116 increases variable [i] to [i+1] (act 740) and loops back to act 730. If [i] does equal the size of the command context 600, the processor 116 sends a completion indicator of the abort command to the host 300 (act 770).

As illustrated by the above example, in this embodiment, when an abort/cancel command arrives for a command that requires scanning of the entire command context data structure 600 (e.g., an iNAND command, such as re-partition or removal of logical units (LUNs)), the processor 116 scans the command context data structure 600 to find the entry associated with the command to be aborted/cancelled and writes a "canceled" bit in that entry. (In another embodiment, if the cancellation is for a single, specific command, the processor 116 can avoid scanning through the entire database.) So, with this embodiment, to cancel a command, the processor 116 merely marks a bit in the command context data structure 600, instead of communicating with all the hardware engines and allocated memory buffers, as in the example shown in FIG. 5.

Figure 8:
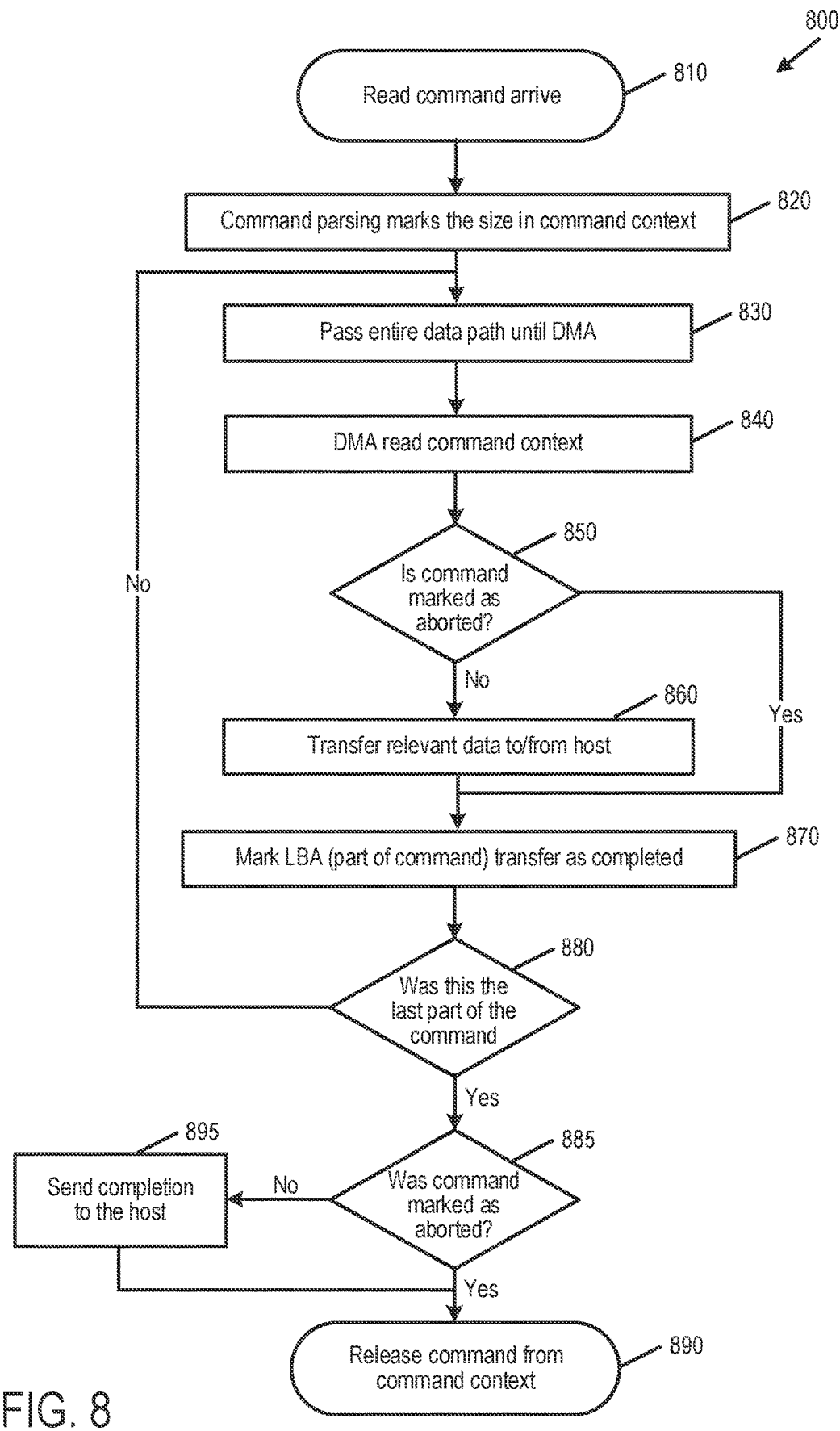
FIG. 8 is a flow chart of a method performed in a storage system of an embodiment in response to receiving a read command.

FIG. 8 is a flow chart 800 that illustrates an example hardware flow of an embodiment when a read command arrives. As shown in FIG. 8, when a read command arrives (act 810), the command parsing module 112 marks the size of the read command in the command context 600 (act 820). The requested data is read from the memory 104 and processed through the entire data path 120 until the DMA controller 122 (act 830). The DMA controller 122 then reads the command context 600 (act 840) and determines if the command is marked as aborted (act 850). If the command is not marked as aborted, the DMA controller 122 transfers the relevant data to the host 300 (for a write command, the data would be transferred from the host 300) (act 860). The DMA controller 122 then indicates that the data was transferred (even though it was not). The DMA controller 122 can do this by marking the LBA (part of the command) transfer as complete (act 870) or by storing or making any other type of assertion at least internally in the storage system 100 (the host 300 may still believe that the command was successfully cancelled). Next, the DMA controller 122 determines if that was the last part of the command (act 880). If there are more parts of the command, the method loops back to act 830. Otherwise, the DMA controller 122 determines if the command was marked as aborted in the command context 600 (act 885). If it was not, a completion is sent to the host 300 (act 895); otherwise, the command is released from the command context (act 890).

As shown by the above example, in this embodiment, when the storage system 100 receives a command, the relevant command context entry is generated and populated. Later, when any part (single or multiple LBAs) reach the DMA controller 122, the DMA controller 122 reads the relevant command context entry. If the command is not marked as cancelled, the DMA controller 122 passes the data to the host 300. Either way, the transfer of this part of the command is marked as completed. If there are more parts of the commands that need to be transferred (or ignored due to cancel indication), the flow waits for more parts to arrive at the DMA controller 122. If, however, this was the last part, a completion can be sent to the host 300, and the command context entry can be evicted for re-use. Thus, in this embodiment, the only change from normal flows is by not transferring the data to the host 300.

There are several advantages associated with these embodiments. For example, these embodiments can be used to cancel a command very quickly (in some implementations, within a few milliseconds). Additionally, by using already-existing flows, these embodiments can provide both firmware and hardware with a robust solution and a single flow for all scenarios with no corner cases.

Figure 9:
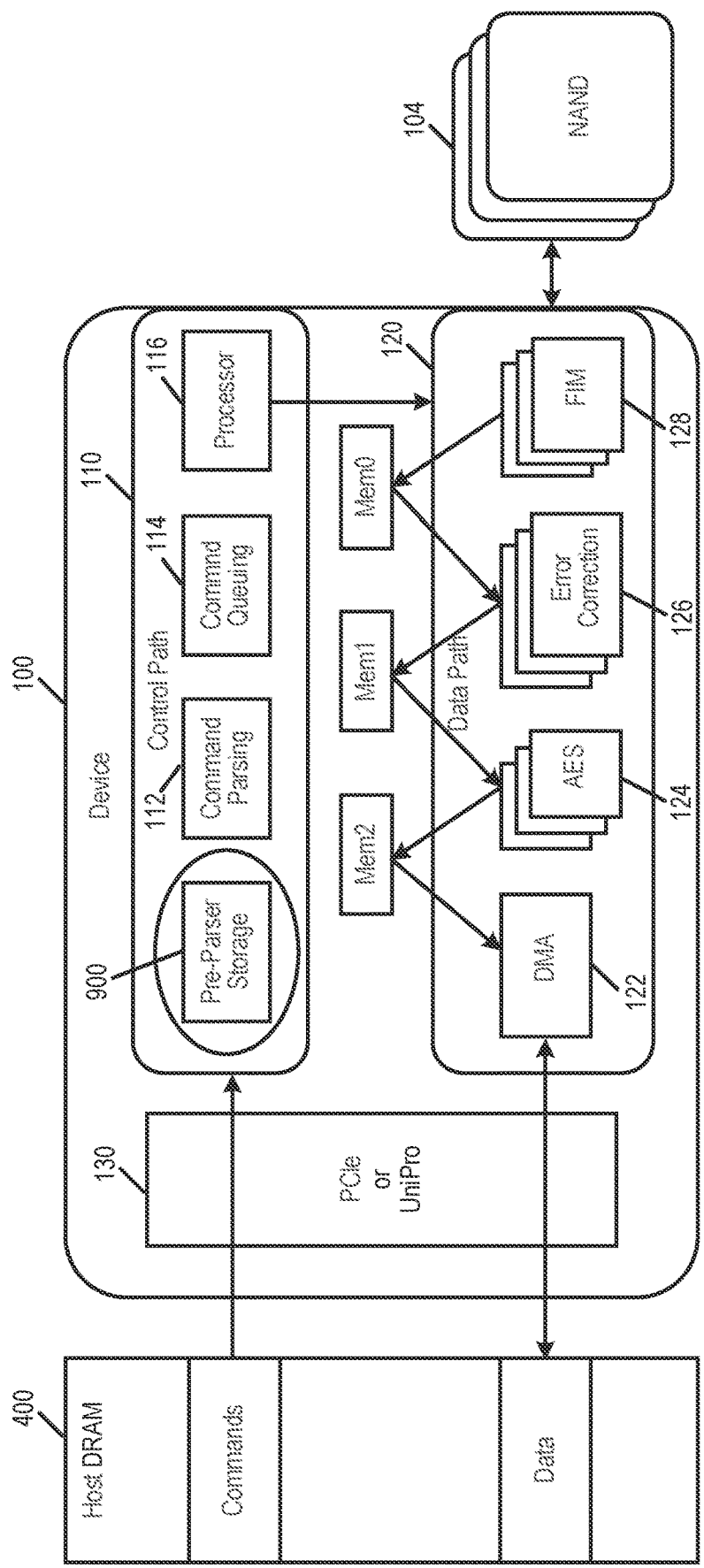
FIG. 9 is a block diagram of a host and storage system of an embodiment.

There are many alternatives that can be used with these embodiments. For example, as mentioned above, these embodiments can be used with read or write commands (the phrase "read/write command" will be used herein to refer to a read command or a write command). In both situations, the data is prevented from being transferred out of the data path, either out to the host (in the case of read) or out to the memory (in case of write). As another example, when the storage system 100 uses UFS or other protocols that support a guaranteed queue depth towards the host 300, the storage system 100 may not be able to simply "abort" commands before the pipeline is clear. Instead, the storage system 100 may need to accept new commands, but the resources for that command are not free until the pipe is actually clear. FIG. 9 shows additional pipe stage that can be added to support these cases. As shown in FIG. 9, pre-parser storage 900 can be added to store commands before they are parsed and allocated resources. Only once a previous command is cleared from the pipe and resources becomes available does information pass from the pre-parser storage 900 to the command parsing module 112. As such, the pre-parser storage 900 can be used to maintain the queue depth required by the protocol.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. In a storage system comprising a memory and a data path, a method comprising:

prior to completion of an in-progress command to transfer data between a host and the memory, receiving an instruction to cancel the command;

allowing data associated with the command to be processed by the data path even though the command was cancelled; and after the data has been processed by the data path but prior to transferring the data out of the data path:
 determining not to transfer the data out of the data path because the command was cancelled; and
 indicating that the data was transferred out of the data path even though it was not by marking a logical block address transfer as complete.

2. The method of claim 1, wherein determining not to transfer the data out of the data path comprises determining that the command is marked as aborted in a command context.

3. The method of claim 2, wherein the command context comprises an indication of cancellation status and an indication of size.

4. The method of claim 2, further comprising in response to receiving the instruction to cancel the command:
 scanning the command context to find an entry associated with the command; and
 marking the command as aborted in the entry.

5. The method of claim 1, wherein determining not to transfer the data out of the data path is performed by a direct memory access (DMA) controller.

6. The method of claim 1, wherein the data path comprising at least one of the following: an error correction stage, an encryption and/or decryption stage, or a memory interface module.

7. The method of claim 1, further comprising allowing the command to be processed by a control path in the storage system even though the command was cancelled.

8. The method of claim 7, wherein the control path comprises at least one of the following: a command parser, a pre-parser storage, a command queue, and a processor.

9. The method of claim 1, further comprising prior to indicating that the data was transferred:
 receiving an additional command;
 storing the additional command; and
 processing the additional command only after indicating that the data has been transferred.

10. The method of claim 1, wherein the command comprises a read command.

11. The method of claim 1, wherein the command comprises a write command.

12. A storage system comprising:
 a memory;
 a host interface;
 a data path coupled with the memory and the host interface, wherein the data path comprises a direct memory access (DMA) controller; and
 a processor coupled with data path, wherein the processor is configured to allow data associated with an in-progress read/write command to be processed by the data path even after the read/write command has been aborted in response to receiving an abort command from a host, wherein the abort command is required to be executed within a predetermined amount of time;
 wherein the DMA controller is configured to, within the predetermined amount of time, identify that the read/write command was aborted and, in response, prevent the data being sent from the data path to the host or the memory.

13. The storage system of claim 12, wherein the DMA controller is further configured to identify that the read/write command was aborted by determining that the read/write command is marked as aborted in a command context.

14. The storage system of claim 13, wherein the command context comprises an indication of cancellation status and an indication of size.

15. The storage system of claim 13, wherein the processor is further configured to, in response to receiving the abort command, searching the command context to find an entry associated with the read/write command and writing an abort indicator in the entry.

16. The storage system of claim 12, wherein the data path comprises at least one of the following: an error correction stage, an encryption and/or decryption stage, or a memory interface module.

17. The storage system of claim 12, wherein the processor is part of a control path that further comprises a command parser, a pre-parser storage, or a command queue.

18. The storage system of claim 12, further comprising a pre-parser storage configured to store an additional command received while the data is being processed by the data path and release the command for processing only after the read/write command has been marked as completed.

19. The storage system of claim 12, wherein the memory comprises a three-dimensional memory.

20. A storage system comprising:
a memory;
means for allowing data associated with an in-progress memory access command to be processed even after receiving a cancel command from a host to cancel the memory access command;
means for sending a response to the cancel command prior to finishing processing of the memory access command; and
means for determining that the memory access command was cancelled and, in response, preventing the memory access command from being completed but nonetheless indicating otherwise after the response to the cancel command was sent.

\* \* \* \* \*